United States Patent [19]

Roller

[11] 4,081,738

[45] Mar. 28, 1978

[54] PLURAL BATTERY CONTROL APPARATUS

[75] Inventor: William G. Roller, Purdy, Mo.

[73] Assignee: G & R Industries, Inc., Purdy, Mo.

[21] Appl. No.: 748,965

[22] Filed: Dec. 9, 1976

Related U.S. Application Data

[63] Continuation-in-part of Ser. No. 607,337, Aug. 25, 1975, abandoned.

[51] Int. Cl.² .............................................. H02J 7/00
[52] U.S. Cl. ........................................ 320/7; 307/71; 320/16
[58] Field of Search ................ 320/6, 7, 8, 15, 16–18, 320/13, 14; 307/71; 318/139

[56] References Cited

U.S. PATENT DOCUMENTS

| 1,474,942 | 11/1923 | Probst | 318/139 |
|---|---|---|---|
| 1,898,370 | 2/1933 | Hughes et al. | 320/6 X |
| 3,029,301 | 4/1962 | Strider | 320/7 X |
| 3,090,871 | 5/1963 | Gorman | 320/15 X |

Primary Examiner—Robert J. Hickey
Attorney, Agent, or Firm—Dunlap, Codding & McCarthy

[57] ABSTRACT

A plural battery control apparatus having a three-position switch for selectively connecting a pair of batteries singly, in parallel or in series to a current load or source via an electrical output connector. Means are also provided for monitoring the voltage condition of the first and second batteries.

5 Claims, 4 Drawing Figures

4,081,738

PLURAL BATTERY CONTROL APPARATUS

CROSS-REFERENCE TO RELATED APPLICATIONS

This application is a continuation-in-part of the Applicant's co-pending application Ser. No. 607,337 entitled "An Improved Electrical Power System", filed Aug. 25, 1975, now abandoned.

BACKGROUND OF THE INVENTION

1. Field of the Invention

The invention relates generally to improvements in electrical power systems, and more particularly, but not by way of limitation, to a rechargeable electrical power system providing selectable voltages.

2. Description of the Prior Art

The choice of power systems for use in marine applications has been very limited in the past. Since the market potential for batteries and other energy sources in this country, and abroad, has been largely in the field of land transportation, the fisherman found that automobile related technology crept over into and dominated his design choices.

Automobile type 12 volt electrical power systems are practically the only systems commercially available for the range of fishing craft of all but the self supporting professionals, and certainly this is true for game fishermen. In fact, larger in-board power craft mostly use the automobile type internal combustion engines, and these are almost always equipped with a 12 volt electrical system. A game fisherman often has a gasoline powered engine or the like to move his marine craft for long distances around a lake area, but he often also has an array of implements that utilize electrical power, such as a troll motor. Also the use of electric motors for prime movers of fishing craft has long been known, and in recent times, there is an increasing trend toward the use of a total electric system for powering small fishing craft.

In any event, whether the marine electrical system is a prime source for motive power, or whether the electrical power source is used principally for trolling, there is increasing usage of electric motors in the marine environment. Many fisherman have found that more satisfactory power utilization is achieved at a higher voltage than that of the standard 12 volt system, and they have combined two or more batteries in series to obtain multiples of the 12 volts obtained from standard batteries. Manufacturers are now offering 24 volt motors, and many are offering combination 12 or 24 volt motors. With the combination 12–24 volt motors, the 24 volt system can be used for moving quickly from one location to another or to move through rough water. A switch is normally provided to switch over to the more economical 12 volt system when precision or long sustained boat maneuvering is required.

Even though such 24 volt motors are available, they are most likely to be powered by the use of plural 12 volt batteries. As these battery systems are used, the problem of charging them arises and this must be accomplished by utilizing 12 volt battery chargers, since 24 volt chargers are not usually available—a further evidence of dependency on the 12 volt standard. And while it is possible to physically disconnect the combined batteries to use one or more 12 volt battery chargers, this is a costly and time consuming process requiring a considerable amount of labor and bother. This is especially true for a game fisherman who has consumed all of the daylight hours on the lake, and must replenish his energy cells during the nocturnal hours, and who himself must arise replenished for the next day of fishing.

One often overlooked aspect of marine electrical systems is that of safely recharging chemical energy cells which are often located in the proximity of gasoline bearing compartments. It is desirable that spark producing acts be carried on remotely to the site of such energy cells, as accumulations of explosive gases, especially during recharging, has led to fires and explosions resulting from sparks emitted during physical hook ups of terminal cables or from battery chargers themselves. The present invention provides an electrical power system that practically eliminates such danger.

SUMMARY OF THE INVENTION

It is an object of the present invention to provide an improved electrical power system that offers a selection of output voltages from a combination of plural batteries.

Another object of the present invention is to provide a rechargeable electrical power system that offers flexible and selective operating voltage utilization.

Another object of the present invention is to provide an electrical power system that can be utilized and recharged from an electrical output connector remotely located to the power source location, thereby effectuating maximum safety.

Another objective of the present invention is to provide a method of combining batteries to provide selective operating voltage utilization and recharging capability.

Another object of the present invention while achieving the above objects is to provide selective monitoring capability of the selectable output voltages.

Another objective of the present invention is to provide an improved electrical power system that offers ease of manufacturability and minimal upkeep and maintenance.

Other objects and advantages of the present invention will be evident from the following detailed description when read in conjunction with the accompanying drawings which illustrate the preferred embodiment of the invention.

DESCRIPTION OF THE PREFERRED EMBODIMENT

Figure 1:
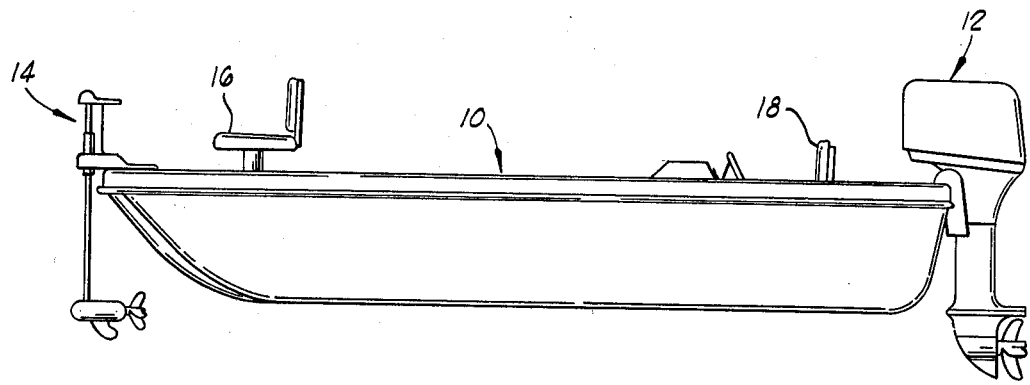
FIG. 1 is a side elevational view of a typical fishing boat.

Referring to FIG. 1, depicted therein is a fishing boat 10 of the type used by game fishermen. The boat 10 has a gasoline powered outboard motor 12, a trolling motor 14, a forward seat position 16, and a rear seat position 18. The trolling motor 14 is electrically operated and requires an electrical power system.

Figure 2:
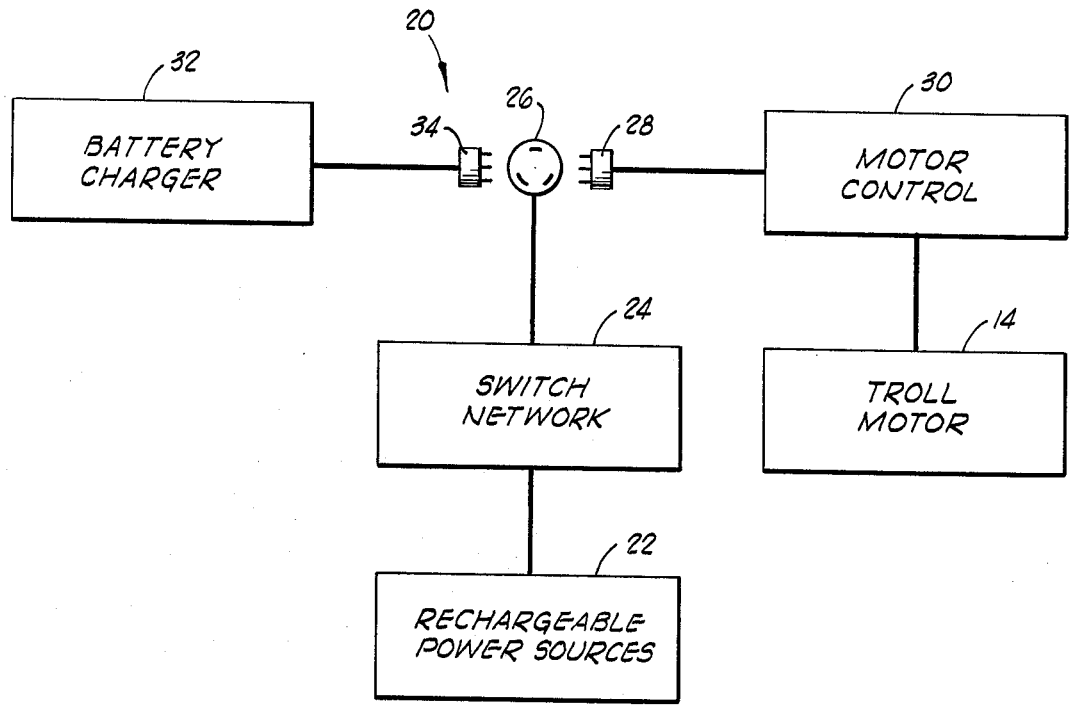
FIG. 2 is a diagrammatical depiction of the plural battery control apparatus of the present invention.

FIG. 2 is a diagrammatical depiction of the electric power system 20 comprising the plural battery control apparatus of the present invention. The rechargeable power sources 22 provide predetermined voltages to a switch network 24 which in turn provides a selectable voltage to an output terminal assembly 26. The electrical output connector 26, which is preferably an electrical socket or the like, is attachable to an input plug 28 to connect the motor control 30 of the troll motor 14 in electrical continuity with the power sources 22. A conventional battery charger 32 is also attachable via a plug 34 to the electrical output connector 26 for the purpose of recharging the power sources 22.

Figure 3:
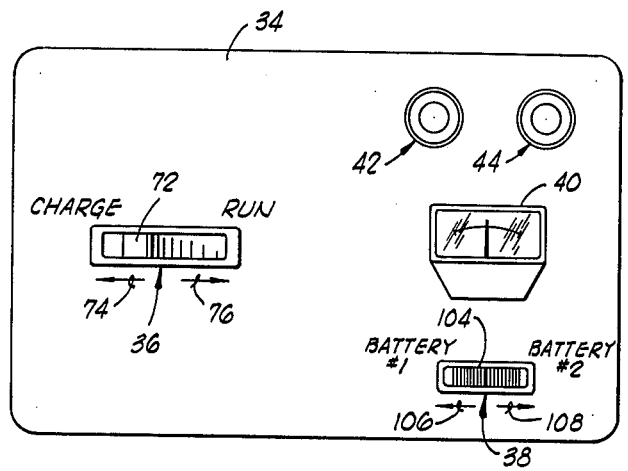
FIG. 3 is a front view of a panel containing the functional switches of the present invention.

FIG. 3 shows a control panel 34 suitable for mounting the various control elements of the switch network 24 at a convenient location in the boat 10, such as adjacent to the forward seat position 16. More particularly, the control panel 34 has mounted thereon, a mode switch 36 for selecting the desired mode of operation of the electrical power system 20; a monitor switch 38 which cooperates with a voltmeter 40 to display the voltage states of each of the power sources 22 as desired; and a pair of fuses 42 and 44 which protect the various elements of the electrical power system 20 from destructive current flow.

Figure 4:
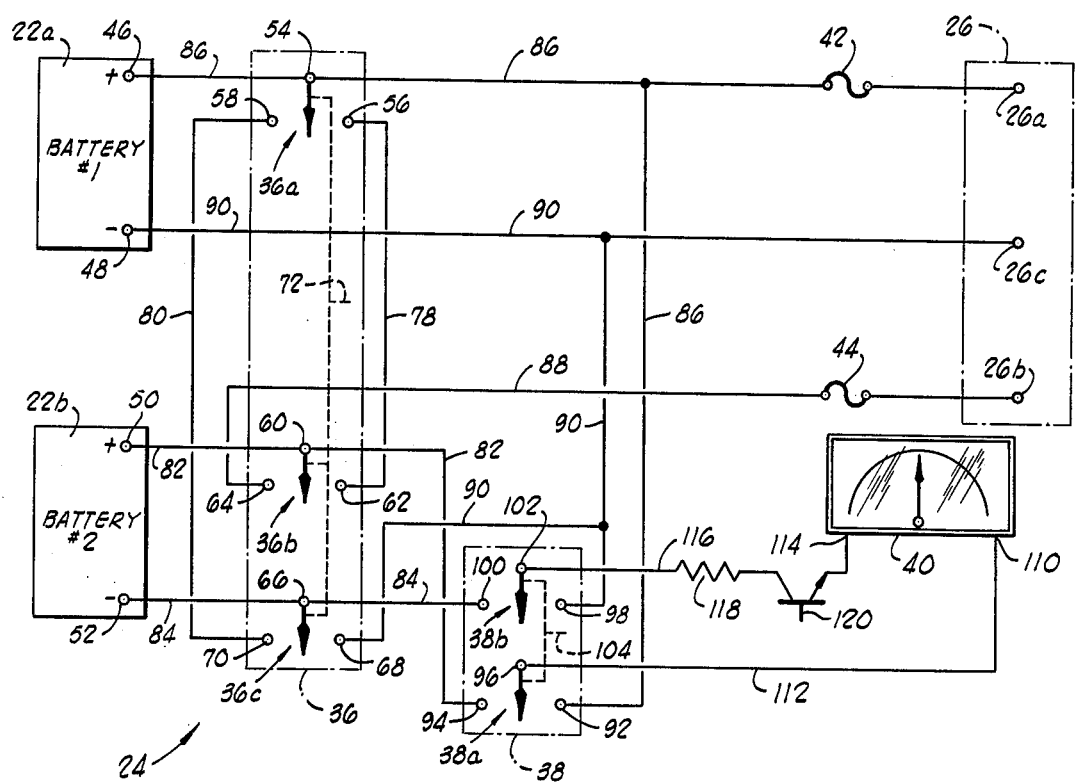
FIG. 4 is a schematic diagram of the plural battery control apparatus of FIG. 2.

As shown in FIG. 4, the electrical power system 20 includes a first battery 22a having a positive terminal 46 and a negative terminal 48; and a second battery 22b having a positive terminal 50 and a negative terminal 52. It will be understood that the first and second batteries 22a and 22b may each comprise one or more physical batteries connected in parallel to have the pairs of output terminals shown.

The mode switch 36 is a triple-pole, double-throw switch assembly comprising a first switch 36a having an input terminal 54, a first output terminal 56 and a second output terminal 58; a second switch 36b having an input terminal 60, a first output terminal 62 and a second output terminal 64; and a third switch 36c having an input terminal 66, a first output terminal 68 and a second output terminal 70. As will be clear to those skilled in the art, the mode switch 36 operates in a conventional manner to electrically isolate the input terminals 54, 60 and 66 from all of the first and second output terminals 56, 58, 62, 64, 68 and 70, respectively, when a throw selector member 72 (see FIG. 3) is in a first or centered position. However, when the throw selector member 72 is moved in a first direction 74 to a second position, the mode switch 36 electrically connects the input terminals 54, 60 and 66 to the first output terminals 56, 62 and 68, respectively. In a similar manner, the mode switch 36 electrically connects the input terminals 54, 60 and 66 to the second output terminals 58, 64 and 70, respectively, when the throw selector member 72 is moved in a second direction 76 to a third position.

The mode switch 36 has the first output terminal 56 of the first switch 36a thereof connected to the first output terminal 62 of the second switch 36b thereof via a conductor 78; while the second output terminal 58 of the first switch 36a is connected to the second output terminal 70 of the third switch 36c via a conductor 80. Further, the input terminal 60 of the second switch 36b is connected to the positive terminal 50 of the second battery 22b via a conductor 82, and the input terminal 66 of the third switch 36c is connected to the negative terminal 52 of the second battery 22b via a conductor 84.

In addition, the mode switch 36 has the input terminal 54 of the first switch 36a thereof connected to the positive terminal 46 of the first battery 22a and to a first power terminal 26a of the electrical output connector 26 via a conductor 86; the second output terminal 64 of the second switch 36b thereof connected to a second power terminal 26b of the electrical output connector 26 via a conductor 88; and the first output terminal 68 of the third switch 36c thereof connected to the negative terminal 48 of the first battery 22a and to the third or common terminal 26c of the electrical output connector 26 via a conductor 90. As discussed generally above, the fuse 42 is preferably interposed in the conductor 86 generally between the input terminal 54 of the first switch 36a and the first power terminal 26a of the electrical output connector 26; while the fuse 44 is interposed in the conductor 88 generally between the second output terminal 64 of the second switch 36b and the second power terminal 26b of the electrical output connector 26.

The monitor switch 38 is a double-pole, double-throw switch assembly comprising a first switch 38a having a first input terminal 92, a second input terminal 94 and an output terminal 96; and a second switch 38b having a first input terminal 98, a second input terminal 100 and an output terminal 102. As will be clear to those skilled in the art, the monitor switch 38 operates in a conventional manner to electrically connect the output terminals 96 and 102 to the first input terminals 92 and 98, respectively, when a throw selector member 104 (see FIG. 3) is moved in a first direction 106 to a first position. In a similar manner, the monitor switch 38 electrically connects the output terminals 96 and 102 to the second input terminals 94 and 100, respectively, when the throw selector member 104 is moved in a second direction 108 to a second position. However, the throw selector member 104 of the monitor switch 38 is normally spring-biased in a third or centered position as shown in FIGS. 3 and 4 to electrically isolate the output terminals 96 and 102 from all of the first and second input terminals 92, 94, 98 and 100, respectively.

The monitor switch 38 has the first input terminal 92 of the first switch 38a thereof connected to the positive terminal 46 of the first battery 22a via the conductor 86, and the first input terminal 98 of the second switch 38b thereof connected to the negative terminal 48 of the first battery 22a via the conductor 90. Further, the second input terminal 94 of the first switch 38a is connected to the positive terminal 50 of the second battery 22b via the conductor 82, and the second input terminal 100 of the second switch 38b is connected to the negative terminal 52 of the second battery 22b via the conductor 84. In addition, the monitor switch 38 has the output terminal 96 of the first switch 38a thereof connected to the positive terminal 110 of the voltmeter 40 via a conductor 112; and the output terminal 102 of the second switch 38b thereof connected to the negative terminal 114 of the voltmeter 40 via a conductor 116 having a resistor 118 and a transistor 120 interposed in series therein.

OPERATION OF THE PREFERRED EMBODIMENT

As will be clear to those skilled in the art, the mode switch 36 of the switch network 24 is interposed generally between the first and second batteries 22a and 22b, respectively, and the electrical output connector 26, and is selectively positionable to vary the voltage and amperage of the signal applied to the electrical output connector 26. More particularly, the mode switch 36 is selectively positionable in the first position, as by the movement of the throw selector member 72 to the centered position, for connecting only the first battery 22a across the first power terminal 26a and the common terminal 26c, of the electrical output connector 26; in the second position, as by the movement of the throw selector member 72 in the first direction 74, for connecting the first and second batteries 22a and 22b, respectively, in parallel across the first power terminal 26a and the common terminal 26c of the electrical output connector 26; and in the third position, as by the movement of the throw selector member 72 in the second direction 76, for connecting the first and second batteries 22a and 22b, respectively, in series across the second power terminal 26b and the common terminal 26c of the electrical output connector 26.

By way of example, assuming that the first and second batteries 22a and 22b each provide (v) volts at (i) amps, the switch network 24 will cooperate with the first and second batteries 22a and 22b to make available a signal of (v) volts at (i) amps across the first power terminal 26a and the common terminal 26c when the mode switch 36 is in the first position; a signal of (v) volts at (2i) amps across the first power terminal 26a and the common terminal 26c when the mode switch 36 is in the second position; and a signal of (2v) volts at (i) amps across the second power terminal 26b and the common terminal 26c when the mode switch 36 is in the third position. Thus, if the troll motor 14 is connected in an appropriate manner to the electrical output connector 26 via the motor control 30 and the input plug 28, the troll motor 14 may be operated at either (v) or (2v) volts at (i) or (2i) amps as desired. Alternatively, if the battery charger 32 is connected in an appropriate manner to the electrical output connector 26 via the plug 34, the first battery 22a may be recharged independently of or in parallel with the second battery 22b [assuming a (v) volt battery charger 32], or in series with the second battery 22b [assuming a (2v) volt battery charger 32].

Substantially independently of the mode switch 36, the monitor switch 38 of the switching network 24 is interposed generally between the first and second batteries 22a and 22b, respectively, and the voltmeter 40, and cooperates with the voltmeter 40 to selectively receive and indicate one of the voltages of the first and second batteries 22a and 22b, respectively. More particularly, the monitor switch 38 is selectively positionable in the first position, as by the movement of the throw selector member 104 in the first direction 106, for connecting the first battery 22a across the voltmeter 40 to display the first voltage; and in the second position, as by the movement of the throw selector member 104 in the second direction 108, for connecting the second battery 22b across the voltmeter 40 to display the second voltage. However, when the mode switch 36 is in the second position thereof, the monitor switch 38 will connect the first and second batteries 22a and 22b, respectively, in parallel across the voltmeter 40 to display the first and second voltages in parallel whether the monitor switch 38 is in the first or second position. Thus, the operator of the electrical power system 20 may conveniently monitor the first and second voltages being provided by the first and second batteries 22a and 22b, respectively, under either load or no-load condition as desired.

It is therefore evident that the above described improved electrical power system 20 is capable of achieving each of the objects set forth. Of course, it will be recognized by persons having ordinary skill in the art that changes may be made in the construction and arrangement of the parts or the elements of the embodiment as disclosed herein without departing from the spirit and scope of the invention as defined in the following claims.

What is claimed is:

1. A plural battery control apparatus comprising:
  a first battery providing a first output current at a first voltage;
  a second battery providing a second output current at a second voltage substantially equal to the first voltage;
  an electrical output connector having a first power terminal, a second power terminal and a common terminal; and
  a 3-position mode switch connected to, and interposed between, the electrical output connector and the first and second batteries; the mode switch having a first position connecting only the first battery across the first power terminal and the common terminal of the electrical output connector, thereby providing the first output current at the first voltage between the first power terminal and the common terminal of the electrical output connector; a second position connecting the first and second batteries in parallel across the first power terminal and the common terminal of the electrical output connector, thereby providing the sum of the first and second output currents at substantially the first voltage between the first power terminal and the common terminal of the electrical output connector; and a third position connecting the first and second batteries in series across the second power terminal and the common terminal of the electrical output connector, thereby providing the sum of the first and second voltages between the second power terminal and the common terminal of the electrical output connector.

2. The apparatus of claim 1 wherein the first battery is further characterized as having positive and negative terminals; wherein the second battery is further characterized as having positive and negative terminals; and wherein the mode switch is further characterized as comprising:
  a first switch having an input terminal connected to the positive terminal of the first battery and to the first power terminal of the electrical output connector, a first output terminal, and a second output terminal, the first switch being selectively positionable in a first position electrically isolating the input terminal thereof, in a second position connecting the input terminal thereof to the first output terminal thereof, and in a third position connecting the input terminal thereof to the second output terminal thereof;
  a second switch having an input terminal connected to the positive terminal of the second battery, a first output terminal connected to the first output terminal of the first switch, and a second output terminal connected to the second power terminal of the electrical output connector, the second switch being selectively positionable in a first position electrically isolating the input terminal thereof, in a second position connecting the input terminal thereof to the first output terminal thereof, and in a third position connecting the input terminal thereof to the second output terminal thereof;
  a third switch having an input terminal connected to the negative terminal of the second battery, a first output terminal connected to the negative terminal of the first battery and to the common terminal of the electrical output connector, and a second output terminal connected to the second output terminal of the first switch, the third switch being selectively positionable in a first position electrically isolating the input terminal thereof, in a second position connecting the input terminal thereof to the first output terminal thereof, and in a third position connecting the input terminal thereof to the second output terminal thereof; and means for simultaneously selectively positioning the first, second and third switches of the mode switch in one of the first, second and third positions.

3. The apparatus of claim 1 further defined to include:

voltage monitoring means for selectively receiving and indicating one of the first and second voltages.

4. The apparatus of claim 3 wherein the first battery is further characterized as having positive and negative terminals; wherein the second battery is further characterized as having positive and negative terminals; and wherein the voltage monitoring means is further defined to include:

a voltmeter having positive and negative terminals;

a monitor switch comprising:
 a first switch having a first input terminal connected to the positive terminal of the first battery, a second input terminal connected to the positive terminal of the second battery, and an output terminal connected to the positive terminal of the voltmeter, the first switch being selectively positionable in a first position connecting the output terminal thereof to the first input terminal thereof, in a second position connecting the output terminal thereof to the second input terminal thereof, and in a third position electrically isolating the output terminal thereof;
 a second switch having a first input terminal connected to the negative terminal of the first battery, a second input terminal connected to the negative terminal of the second battery, and an output terminal connected to the negative terminal of the voltmeter, the second switch being selectively positionable in a first position connecting the output terminal thereof to the first input terminal thereof, in a second position connecting the output terminal thereof to the second input terminal thereof, and in a third position electrically isolating the output terminal thereof; and means for simultaneously selectively positioning the first and second switches of the monitor switch in one of the first, second and third positions.

5. The apparatus of claim 4 wherein the mode switch is further characterized as comprising:

a first switch having an input terminal connected to the positive terminal of the first battery and to the first power terminal of the electrical output connector, a first output terminal, and a second output terminal, the first switch being selectively positionable in a first position electrically isolating the input terminal thereof, in a second position connecting the input terminal thereof to the first output terminal thereof, and in a third position connecting the input terminal thereof to the second output terminal thereof;

a second switch having an input terminal connected to the positive terminal of the second battery, a first output terminal connected to the first output terminal of the first switch, and a second output terminal connected to the second power terminal of the electrical output connector, the second switch being selectively positionable in a first position electrically isolating the input terminal thereof, in a second position connecting the input terminal thereof to the first output terminal thereof, and in a third position connecting the input terminal thereof to the second output terminal thereof;

a third switch having an input terminal connected to the negative terminal of the second battery, a first output terminal connected to the negative terminal of the first battery and to the common terminal of the electrical output connector, and a second output terminal connected to the second output terminal of the first switch, the third switch being selectively positionable in a first position electrically isolating the input terminal thereof, in a second position connecting the input terminal thereof to the first output terminal thereof, and in a third position connecting the input terminal thereof to the second output terminal thereof; and means for simultaneously selectively positioning the first, second and third switches of the mode switch in one of the first, second and third positions.

* * * * *

UNITED STATES PATENT OFFICE
CERTIFICATE OF CORRECTION

Patent No. 4,081,738  Dated March 28, 1978

Inventor(s) William G. Roller

It is certified that error appears in the above-identified patent and that said Letters Patent are hereby corrected as shown below:

Column 3, line 3 - "output terminal assembly" should be --electrical output connector--

Signed and Sealed this

Fifteenth Day of August 1978

[SEAL]

Attest:

RUTH C. MASON
Attesting Officer

DONALD W. BANNER
Commissioner of Patents and Trademarks